(12) United States Patent
Weber

(10) Patent No.: US 7,012,652 B1
(45) Date of Patent: Mar. 14, 2006

(54) AUDIO HUSH FOR ENTERTAINMENT EQUIPMENT AND PARTICULARLY TELEVISION RECEIVERS

(75) Inventor: Harold J. Weber, Centerville, MA (US)

(73) Assignee: Sam Stuff Property Trust, Centerville, MA (US)

( * ) Notice: Subject to any disclaimer, the term of this patent is extended or adjusted under 35 U.S.C. 154(b) by 565 days.

(21) Appl. No.: 10/338,096

(22) Filed: Jan. 9, 2003

(51) Int. Cl.
*H04N 3/24* (2006.01)
*H04N 5/60* (2006.01)
*H04N 5/44* (2006.01)

(52) U.S. Cl. .................. 348/632; 348/734; 348/738

(58) Field of Classification Search ............... 348/734, 348/632, 738, 725; 340/825.69, 825.72; 455/352, 355, 92; 381/104–108, 58, 59; H04N 5/60, H04N 5/44, 3/24
See application file for complete search history.

(56) References Cited

U.S. PATENT DOCUMENTS 6,396,549 B1 * 5/2002 Weber .................. 348/734
6,628,344 B1 * 9/2003 Weber .................. 348/734

* cited by examiner

*Primary Examiner*—Sherrie Hsia

(57) ABSTRACT

A user operated remote controller for quieting of sound volume from a television set or other entertainment equipment. User remotely commands an abrupt lowering of the volume to a HUSH level intermediate between a normal and a muted volume level. A remote control command receiver responds to a uniquely encoded wireless "lower the volume" command signal and the volume is immediately lowered to a HUSH level preset just loud enough to telltale a viewer when a program content change occurs, or to allow a parallel activity such as answering a telephone, without completely losing the gist of the audio program content or denying other persons from quietly listening to the program. Temporarily lowers overbearing volume of a television program during station breaks and commercials, while enabling the user to audibly notice when the principal program resumes. Changing a channel selection on a televisor may automatically initiate the lower-volume HUSH mode.

20 Claims, 11 Drawing Sheets

AUDIO HUSH FOR ENTERTAINMENT EQUIPMENT AND PARTICULARLY TELEVISION RECEIVERS

PROBLEM OVERVIEW

One of the more annoying problems associated with entertainment equipment and in particular television receivers (televisors), including home theaters, is the "overbearing loudness" which the audio content often delivers, particularly when it blasts-forth during commercials and station-breaks. Nearly every television receiver includes a "mute" function, usually operated by manually actuating a specifically designated "MUTE" keybutton on a hand-held remote "commander" or controller.

Muting Shortfalls

Simply muting the audio merely translates the excessive noise situation into yet another problem, exemplified by the viewer not being able hear the sound content at all. This muted silence translates into an alternatively disagreeable situation where the viewer is effectively blocked from noticing (by a fanfare associated with program resumption or a subtle telltale change in the ongoing sound content) that the desired programming has, in fact, resumed.

In another set of circumstances, a viewer may be watching a program and receive a telephone call, or else have a visitor appear with a question. Under such circumstances, the usual "mute" control may be enabled with result that the television receiver, radio or other entertainment device is muted and becomes totally silent. As a consequence of muting, the viewer or listener can not hear any portion of the audio content. This total quieting may often be undesirable and even rude when others are present and watching the same program.

Lowering the Volume

A better solution is to simply "lower the volume" to a more modest level, where a parallel conversation can be maintained on the telephone or with a visitor while still "keeping an ear" tuned to the television or radio set's audio. Unfortunately, lowering the volume using the usual remote controller is usually cumbersome and annoying, particularly while at the same time holding a telephone handset, or else conversing with a visitor. It is not unusual for a person to confuse the remote controller's "volume" buttons with the "channel up/down" buttons and end up switching channels or causing other changes instead of merely lowering the volume, while at the same time trying to deal with the distraction of responsively answering the incoming telephone call.

HUSH as a Control Function

A far more satisfactory procedure is now contemplated to overcome the excess loudness problem where, upon merely pressing one button on the remote controller, the audio level is instantly reduced to a preset limited level. This "HUSH" control's quieting function is preferably established as a practicable alternative to the usual "MUTE" control's silencing function. The HUSH control practiced in accord with this invention is intended to merely augment the usual MUTE control function and not necessarily to supplant nor be an universal alternative to the MUTE function.

Upon completion of the telephone conversation or other event, the HUSH level mode may be canceled and the audio may return back to the normal volume level, usually by at least one action of actuating the HUSH control, the MUTE control, or a volume control buttons on the remote controller.

Disruptive Audio Noise

Another annoying problem occurs when television program channels are changed. The audio volume for the newly selected channel often thunderously and unexpectedly "booms-in" as a result of the channel change.

Aside from fully silencing the television with the MUTE function, or readjusting the volume of the television set, no quick and easy method for reducing the volume to a lesser level is normally available to the viewer. Therefore the automatic channel-change prompted "hushing" of the audio to a lower preset level in accord with the novelty of this invention is immensely desirable. Subsequent to the automatic, station-change related "hushing" of the sound to a moderate level, the normal volume level may be conveniently resumed by an intentional pressing the HUSH button, MUTE button or volume-level control button by the viewer.

It is evident that another aspect of the problem dictates that the establishing of the degree of hushed-down volume level needs to be available to the user as a readily changeable preset. Clearly a resolution to this part of the problem infers that the capability for presetting the HUSH level preferably should be convenient for the user to accomplish and to change from time-to-time. For example in one preferred form of the present invention, the HUSH level reduction is preset and locked by a compound action of keybuttons provided on the remote controller.

Universal Remote Controllers

Universal remote controllers, viz "remote commanders", have achieved widespread acceptance and usage in providing a shared capability for operating more than one piece of entertainment equipment. The problem with pre-existing remote controls and universal remote controls in general is that they inherently have no provision for particularly delivering a HUSH command. They typically only have provision for a full-MUTE command. The use of these pre-existing or common universal remote controllers to activate the HUSH mode of operation, when used in conjunction with a HUSH-able television receiver or radio is another problem needing resolution in a practicable HUSH system. In other words, ordinary and unmodified remote controllers are remissly obsolete in their capability for initiating a HUSH command.

Obviously, the VOL-DOWN keybutton may be repeatedly actuated to lower the volume, but this defeats the most fundamental advantage of the HUSH command principle. The shortfall in using several VOL-DOWN keybutton actuations in order to attain volume reduction is that no inherent methodology prevails which allows the viewer to quickly return the televisor's volume to essentially the same level it was set for prior to the volume reduction.

Moreover, the known art is absolutely silent regarding keybutton actuated provisions for obtaining an abrupt lowering of the volume level to a lesser preset value ordinarily proportioned between the normal volume level and the mute level. Furthermore, once the hush level is attained, the known art is also silent about a capability for abruptly restoring the normal volume level.

To overcome this problem and maintain the universal concept, the conventional controller needs to have a dedicated HUSH keybutton or else be able to admit a duplexing of some existing button combination without resorting to special purpose and more costly remote controller design, typified by those which include "macro" (programmable) commands.

The limitations of predecessory remote controllers is better overcome by merely simulating a HUSH command entry with some unique combination of command sequences utilizing the ordinary keypad layout and keybutton entries without resorting to an upgraded inclusion of a dedicated HUSH keybutton. This combinatorial keybutton action saves existing remote controllers from obsolescence in view that the actual abruptly changed HUSH function is included in the remotely controlled entertainment apparatus.

While many various combinations may be implemented through differing engineering approaches, one illustrative approach is to share the usual MUTE button as a virtual HUSH button, obtained by utilizing an actuation of another keybutton such as any one of the usual integer channel number selection buttons 1–9 just prior to pressing the MUTE button. For example, keybuttons "1" or "" plus the "MUTE" keybutton (hence: "+MUTE" or "1+MUTE") may be pressed. As a result, the encoded sequence representing the integer "" or "1" plus the encoded sequence representing the MUTE function may be sent as a combinational sequence remote command signal. The remote control command receiver intrinsic with the entertainment apparatus (a televisor, for example) is appropriately engineered to recognize this combinational sequence (or some other combinational sequence) as indicative of a HUSH mode, with the obvious result of quieting the sound loudness to a more modest level.

A problem in using universal remote controls with the methodology of this invention is shown to be overcome by these previous examples. An underlying intent of this invention is that the novelty of this invention is not restricted to use with a "proprietary" remote controller. Rather, the advantages of sound level lowering may be obtained using nearly any common remote controller known in the prior art in conjunction with any suitable sound producing apparatus the volume level of which is capable of remote control in accord with the principal teachings of this invention.

This teaching contends however that a maker of universal types of remote controllers may elect to particularly include the unique feature of a dedicated HUSH keybutton in their new designs which may be actuated by a user to implement the novelty of the sound muffling or quieting feature.

TYPICAL PRIOR ART

In an earlier U.S. Pat. No. 6,396,549 issued May 28, 2002 to the present inventor, a method is divulged which is suitable for reducing a television receiver's sound to a "partial mute level". The teaching of this '549 patent depends upon a specially adapted remote controller used in conjunction with any common type of remotely controllable televisor. The partial muting, or HUSH mode is obtained by utilizing the stepping provision for volume incrementation almost universally incorporated into contemporary television sets (and similar equipment).

The remote controller is designed to deliver a pre-determinate sequence of encoded "volume down" auto-stepping pulse signals to the television set, sufficient to reduce the volume to zilch. The remote controller then automatically reverses-itself, stepping-up an increase in the volume level by delivering a deliberate number of encoded "volume up" pulse signals. Through the expedient of presetting the deliberate number of allowed "volume up" pulse signal steps, the televisor's volume may be reset to a more modest level i.e., at whatever level the user may prescribe.

In view that this earlier invention of the '549 patent uses a patterned series of pulse steps to first fully reduce then deliberately albeit incrementally increase the televisor's volume level, a remote controller sporting the capability for delivering the pulse stepping pattern is necessary. Furthermore, the quieting effect is not instantaneous, but rather it requires a short period of time to bring about the hushing effect, during which the remote controller and the remotely controlled televisor must be cooperatively linked together.

In the usual remote controller utilizing an encoded infrared beam for wireless coupling, it is necessary that the remote controller delivering the infrared beam is maintained in alignment with the corresponding remote control command receptor on the televisor until the incrementation of the HUSH command is completed. This action may require at least a second of uninterrupted coupling between the remote controller and the remotely controlled televisor.

The strength of this earlier invention is most satisfactorily found in it's potential for compatible broad-based application with virtually any type of televisor or similar piece of entertainment equipment. On the other hand, the technique of this earlier invention does not provide for an immediate HUSH mode of operation, where pressing a single button or a prescribed combination of buttons on an ordinary universal remote control can instantly effectuate the quieting afforded by a lowered audio level.

The prior art invention and the present invention are virtual opposites in method and embodiment, albeit they achieve about the same virtual result. Their comparison is found in:
 1. The earlier invention shown in the U.S. Pat. No. 6,396,549 describes a special remote controller using the methods of and built in accord with the teachings proffered by the '549 patent and it urges cooperation with any common type of remotely controlled entertainment apparatus, such as a television set, etc.
 2. The present invention describes a remotely controlled entertainment apparatus, such as a television set, etc. which includes a special remote control signal receiver using the methods of and built in accord with the teachings proffered by this invention which is not only capable of working with a remote controller having a dedicated HUSH keybutton, but also capable of working with any common type of "universal" remote controller.

Closed Caption Enhances HUSH Mode

Contemporary televisors generally provide "closed caption" display of audio content as an ongoing series of subtitles. While this feature is ordinarily intended for the hearing-impaired viewer, it also offers advantage to the ordinary viewer when the sound volume level is set low, or when the program content varies widely. The presently explored HUSH function mode also benefits from utilization of the dynamic closed caption display. In particular, when the HUSH mode is entered and the audio volume is lowered by a substantial extent, dynamic closed captioning is beneficial. Therefore, the automatic presentation of the closed caption displays concurrent with the HUSH mode activation is presently considered to be an option offering considerable benefit to the viewer.

FIELD OF MY INVENTION

My invention generally pertains to a method and appropriate apparatus for markedly reducing the annoying and unwarranted loudness of television programming and other entertainment apparatus, particularly while trying to sustain a nominal capability for carrying on a mutual conversation with another person or when trying to hear another sound source. In particular, my invention relates to the substantial reduction of sound during commercials, station breaks and similar periods of time without fully quieting the televisor or other apparatus. It is also capable of taming, or quieting exceptionally loud or raucous portions of normal program content after which the volume may be immediately returned to its normal level. My invention further addresses a television viewer's preference for "killing the sound", such as during a commercial or station break which has led to a nearly universal inclusion of the MUTE function in modern televisors and similar equipment.

Unlike the ubiquitous MUTE function, this teaching offers a reasonable moderation of sound level as opposed to the prior methods of fully silencing the sound. A remarkable advantage afforded by partial quieting, or what is referred to the "HUSH" mode in this presentation is that the sound may be maintained at a still-hearable level, without the blasting and overbearing loudness often associated with television programming and in particular station breaks and commercials. Additionally, the partial quieting is useful when a person is trying to carry on a conversation with another either in person or on a telephone. The partial reduction of the sound level allows the conversation to proceed, without fully denying audio program content to other viewers.

Unlike merely "turning the volume down" (using the usual "VOL-DOWN" keybutton), the HUSH keybutton function offers the user the opportunity to instantly reduce the volume level to a presettable moderate level and subsequently return it to the "normal" volume level. Unlike the present day practice of gradually "turning the volume down" in step-like increments, the HUSH is novel in that it abruptly changes the volume from a first ("normal")level to a moderated second (presettable HUSH) level.

BACKGROUND OF INVENTION

All sound is noise when it gets in the way of hearing something else, or when it disrupts a prevailing environmental quietude. Most particularly, commercial television and radio programming contain many periods of utter noise. Station breaks and commercials are typical of these kinds of annoying trash sounds. More problematic is the illusion, if not reality, that commercials and similar content interspersed between desirable programming are run at a higher volume level to make them into an even more annoyingly piercing background racket, particularly when the viewer or listener is trying to converse with another person.

Mute Means Complete Silence

Recognizing the raucous nature of commercial broadcasting sound such as frequently encountered on television has led most manufacturers of television sets and similar entertainment equipment to presently include the MUTE function as standard part of their remote controller's user convenience offering. A MUTE command ordinarily completely quiets, or silences the remotely controlled sound source. As a result, the sound is "shut off" and nothing can be heard.

Complete silencing such as delivered by the MUTE function is a long-standing solution to the noise problem. It is however, not necessarily the best. Realize how often viewers opt to "turn-down" a televisor's sound to a very low, nearly whisper-like level instead of using the MUTE function. As a result, the viewer may be able to carry on a conversation with another person, on the telephone or in person, while still following the gist of the television program content.

A lowered sound level leads to an almost subliminal capacity to appreciate the program content flow without interfering with a concurrent conversation, especially if it is accompanied by "closed captioning". A typical example is to "lower the volume" during a commercial to such an extent that the sound is not annoying in the sense of carrying on a conversation with another person. The lowered sound is sufficient to allow the viewer to "notice" when the sound changes back to the program content, without the necessity for actually watching the television screen to see when the program resumes.

A total muting of sound masks this capability for listening for a change in sound content to flag the return of desirable programming as compared with periods of utter noise such as delivered by station breaks and commercials. Therefore this overkill of total quieting afforded by the MUTE function provided with most remote controller functions is only marginally satisfactory. A semi-MUTE, or HUSH mode of operation is anticipated by this invention to be a far more satisfactory and useful mode.

The HUSH mode serves to partially-MUTE and quietdown the sound loudness level, but it does not go so far as to absolutely silence the sound. In other words, the sound level is reduced from being absolute bedlam noise such as during a commercial or station break, to being a nearly subliminal sound level which can be preset to be just of sufficiently loudness level to be noticeable but mostly unobjectionable. Prior to this invention, the partial reduction of sound level was attainable only by multiple actuations of the "volume down" keybutton function.

Recognizing the inconvenience and inconsistency of this prior technique for reducing volume, that is by making a series of "volume down" (VOL-DOWN key) keybutton entries led to this invention. Now a single button may reduce the sound level to a preset lower level. The HUSH button may be separately embodied, similar in form to that of the ubiquitous MUTE button, except that it operates to merely lower the sound and not bluntly shut it off.

SUMMARY OF INVENTION

This device delivers a method of abruptly reducing the audio volume of a television or radio program's content from an overbearing raucous level to a quieter and more bearable level and subsequently enabling an immediate return of the audio volume level to its original level to which it was set prior to the intentional reduction.

Television programming is a classic example of a mix of commercials and station breaks interspersed between segments of desirable program content. The audio content makeup of commercials and station breaks is often overbearingly loud and raucous in character. Whether or not the volume level is technically increased during a commercial, it is not unusual for a commercial or station break to appear excessively loud and be unusually overbearing by the intensified nature of the sound content. The result is often merely a brouhaha of sheer noise insofar as the viewer or listener is concerned.

Muting the television program during station breaks and commercials is a long-standing albeit imperfect solution to this problem. Contemporary remote controllers are nearly always found to include a MUTE keybutton, usable by the viewer to send a MUTE command to the televisor. Muting results in the sound level being reduced to nil. Such total reduction of the sound content may be counterproductive, from the viewer's perspective. Often a viewer may prefer keeping "one ear tuned" to a lowered-volume sound level which may give indication of when the desirable portion of the programming resumes, e.g., when the station break or commercial is "over".

Manual Volume Reduction

Heretofore, the principal method of quieting commercials and station breaks has been to "turn the volume down". This might be accomplished by using the VOL-DOWN keybutton included as an intrinsic function of conventional remote controllers. The obvious disadvantage of this conventional volume-lowering method is that the volume level setting is actually changed and then to regain the "normal" volume level when the program content resumes requires a full resetting of the volume level using the VOL-UP keybutton. While it might be possible to take notice that the volume was lowered by "five steps" and then it may be returned by increasing it by "five steps", this definitely requires more effort and mental concentration on the part of the viewer.

HUSH Mode Lowers Volume and Returns to Same Level

Hence it is this teaching's intent to show how the audio level or volume of an offending televisor or radio may be presently lowered to a lesser level by a simplified keybutton activity and then the pre-reduction sound level may be immediately regained by a further keybutton activity. The lowering and returning of the sound level is attainable without regard to "how much" but rather it is a binary setting, either it is lowered to a HUSH level or it is returned to a NORMAL level to which the volume was set prior to the HUSH command. This removes most if not all of the disconcerting guesswork from the quieting function.

HUSH Keybutton

In a rudimentary practice of this feature, a distinctively separate HUSH keybutton may be provided on the remote controller's keypad layout, similar in form to the commonplace MUTE keybutton. Pressing the dedicated HUSH keybutton sends a wireless command to a remote control command receiver intrinsic with the controlled televisor (or radio). The result is an immediate lowering of the volume level to a reduced-level, intermediate between that of a "normal listening" level and fully-silent. Again pressing the HUSH keybutton, or else the VOL-UP or MUTE keybutton may send a second wireless command which urges the remote control command receiver to signal the televisor to return the sound level to its normal, pre-reduction level.

Universal Remote Controllers

Universal remote controllers are frequently acquired by consumers to conveniently control several different devices from a single shared controller. The reach the fruits of this teaching the viewer may utilize a common type of universal remote controller to bring about the HUSH mode, without the actual inclusive usage of a HUSH keybutton. In one embodiment, as hereinafter described, the MUTE keybutton may be utilized to impart the HUSH function by preceding the actuation of the MUTE keybutton with an entry of an integer keybutton entry and preferably a "" or a "1" preceding the MUTE keybutton's actuation. It is noteworthy that the use of the "" or "1" as the precursor eliminates issues of self-completion of single digit entries afforded by certain prior-art remote controllers. As previously taught under issued U.S. Pat. No. 6,094,239 and U.S. Pat. No. 6,396,549, a single-digit entry may result in automatic self-completion of a "channel number" command through an automatic prefixing of a leading "". Hence if an integer value entry between 2 and 9 is used, it may errantly submit an automatic channel change command to the televisor by, for example, automatically prefixing a stand-alone integer "5" entry with a "" resulting in a "5" command signal.

By using "" or "1" preceding the MUTE keybutton entry, this erroneous entry consideration is eliminated because even if the "self-completing" channel selection precursor is added, the resulting channel selection command of "" or "1" is necessarily maintained as invalid because "channel " is ordinarily invalid and "channel 1" is not in commonplace usage.

In other words, by pressing the integer keybutton "" or "1" preceding the pressing of the MUTE keybutton on a universal remote controller, the correspondent televisor may be engineered to merely reduce the volume to a more modest level rather than mute the sound altogether. Additionally, the choice of the precursor integer may be recognized by the remote control command receiver to define more than one hush level setting. For example, pressing "+MUTE" may deliver a different preset HUSH level from the preset HUSH level extent obtained by pressing "1+MUTE".

The practicing artisan shall fully realize the obvious usage of other keybutton selections and sequences may be alternatively employed to attain the equivalent methodology of the preceding example. The essence of this illustrative approach is to clarify by descriptive example how an earlier universal remote controller may be realized as functionally compatible with and readily utilized to effectively implement a HUSH control mode.

Automatic HUSH Upon Channel Change

A channel change often introduces a radically different sound level or character. For example, switching channels between a rather quiet dramatic or romantic movie to a fast and furious action movie may cause a startling and annoying clamor which may surprise casual or napping viewers. To overcome this long-standing problem with blatant blasting which may occur in ordinary sound reproduction from televisors and radios, a HUSH command is automatically introduced whenever a channel selection or station change is realized, usually by the remote control command receiver. In other words, instructing the televisor to change from channel "12" to channel "37" automatically lowers the accompanying audio volume to a preset HUSH level.

Subsequent to the channel change, the normal volume level may be regained, usually through merely exercising an expedient of pressing an appropriately marked HUSH keybutton, momentarily pressing the usual MUTE keybutton or by pressing either one of the VOL-UP or VOL-DOWN keybuttons. It is obvious that various combinations of these keybutton actions, or even other keybutton options may be utilized to recover the hushed-down volume level to its normal loudness level. A preference is that when the televisor is in the hush mode, the HUSH button assumes an anti-HUSH role, e.g. its actuation "un-hushes" the televisor's quieted sound back to it's normal volume level.

Remotely Presetting HUSH Level

A viewer's preference for the residual HUSH level may most conveniently be set from a remote controller, particularly one which is equipped with a dedicated HUSH button. However, it may also be designed into pre-existing universal remote controller by utilizing unique entry sequences at the remote control command receiver, e.g. at the televisor or radio.

Using HUSH Keybutton Access

A special sequence such as (for example) sending a predetermined integer such as "9" as a precursor to sending the HUSH keybutton entry may be utilized to initiate a setup mode in association with the remote control command receiver and the televisor. Once the mode is entered, the user may utilize the usual VOL-UP and VOL-DOWN keybuttons to adjust a preferred HUSH level. Once the desired level is attained, the user may again enter a second predetermined sequence of an integer as a precursor to again submit the HUSH keybutton entry. Such a subordinate command sequence might be the integer "8" as a precursor to the HUSH entry. Furthermore, a mere entry into the HUSH keybutton may be recognized as a completion of this setup mode. The subordinate command immediately closes the setup mode and fixes the HUSH volume at the preset level. Subsequently, each future HUSH command entry will drop the audio volume to this preset level.

Using MUTE Keybutton for HUSH Level Setting

In a similar manner the special sequence is sent as a predetermined precursory integer such as "6" followed by entry of the MUTE keybutton. This unique "6+MUTE" sequence may serve to initiate a setup mode in association with the remote control command receiver and the televisor. Once the mode is entered, the user may utilize the usual VOL-UP and VOL-DOWN keybuttons to adjust a preferred HUSH level. Once the desired level is reached, the user may next enter a second predetermined sequence such as "5+MUTE" as a unique key combination. It is the object of this second sequence command to immediately close the setup mode and fix the HUSH volume at the preset level. Subsequently, each future albeit variously attained HUSH command entry will drop the audio volume to this preset level.

Locally Presetting HUSH Level

Remote setup of the HUSH level is ordinarily the most convenient, since the volume level may be immediately adjusted from the viewer's normal listening location. However the remote control command receiver may also be configured to accept "local preset" entries. This setup may be embodied merely as an analog volume control having limited access. It may also be preset by utilizing digital volume control adjustment. In either arrangement, the viewer causes the remote control command receiver to temporarily go into a "setup mode". While in the setup mode, the audio level may be variously preset for utilization by the HUSH mode. During this setup mode, the viewer may adjust the HUSH volume level whereafter the setup mode is closed. The preset HUSH volume level is now the HUSH level setting for every subsequent HUSH command.

OBJECTIVES

A primary objective of my invention is to immediately reduce but not fully silence the audio content of an entertainment program upon manual command by the listener.

A purpose of my invention is to reduce the volume of a television set, particularly when answering a telephone call or while the user is otherwise conversing with another person.

A gist of the invention is to abruptly cut the audio volume to usually less than half of it's normal setting upon a manual command entry by a listener actuated keybutton.

A key purpose for the invention is to permit an objective manual keybutton actuated lowering of televisor volume during commercials and station breaks to conveniently avert viewer annoyance and aggravation.

The spirit of the invention is to allow a "one button" abrupt reduction of televisor sound levels which may be immediately resumed at their normal level as determined by recognition a viewer's command entry.

An important aspect of my invention is to give an automatic reduction of sound volume to the HUSH level in immediate response to an entry of a change in program selection, such as a channel change on a television receiver.

The essence of the invention is to provide for the reduction of sound levels in the form of a HUSH command manually submitted by a user, ordinarily as the actuation of a function-oriented keybutton sited on a remote controller.

It is an important intent to provide for the virtual actuation of a HUSH command which may be equivalently submitted by the user as a complementary actuation of at least one otherwise dedicated-function keybutton sited on a universal replacement type of remote controller.

A key provision of this invention is to instantly reduce the sound volume to the HUSH level whenever the tuning of an associated receiver is changed, for example when a channel change on a television receiver is entered.

Yet another object of the invention is to allow various HUSH levels to be established through unique keybutton actuation of the keypad associated with a cooperating remote controller. For example, prefixing the "volume decrease" or "VOL-DOWN" keybutton entry with a single integer value, e.g. key number entries 1 through 9 may introduce various changes in hush-down level weighted by the integer value.

The essence of my invention is to assure a user an instantaneous HUSH reduction of excessively loud sound levels with only a momentary alignment of a remote controller with the remotely-controlled offending-sound source device.

It is a further intent to provide an overall operational device function in which the televisor or other sound source apparatus operates conjunctively with a remote controller device to immediately reduce or "HUSH-down" the audio volume level delivered by the sound source apparatus.

Additionally, my invention intends that a user may variously establish alternate levels of lowered-down sound levels through presetting the hush level to a desired level.

A further goal of my invention is to permit remote preset of the HUSH volume level through commanding entry into and exit from a setup mode by unique combinatorial entry of keybuttons, such as "9+HUSH" or "4+MUTE". Subsequent to the setup mode entry, the HUSH volume level may be preset utilizing the remote controller's usual VOL-UP and VOL-DOWN keybuttons. After the desired level, the setup mode may be exited by following the volume setting phase with a second unique combinatorial entry of keybuttons, such as "8+HUSH" to fix the volume level to the preset level during activation of a HUSH command.

My invention also proposes that a sound source, such as a televisor, may be designated to deliver more than one intermediate value of HUSH level aside from that of normal volume and that these alternate HUSH control levels may encompass: "normal, 'HUSH-high', 'HUSH-low' and mute", for example.

My invention further intends to show an automatic enablement of an on-screen display of "closed caption" text display concurrent with an enablement of the HUSH mode.

Lastly, my invention allows the user to remotely lower the volume to a less overbearing level during station-breaks and commercials while retaining a just-sufficient loudness level adequate to maintain an awareness of when the desired program content is resumed.

DESCRIPTION OF DRAWINGS

My invention is depicted by 11 sheets of drawings showing 11 figures, including.

DESCRIPTION OF INVENTION

Figure 1:
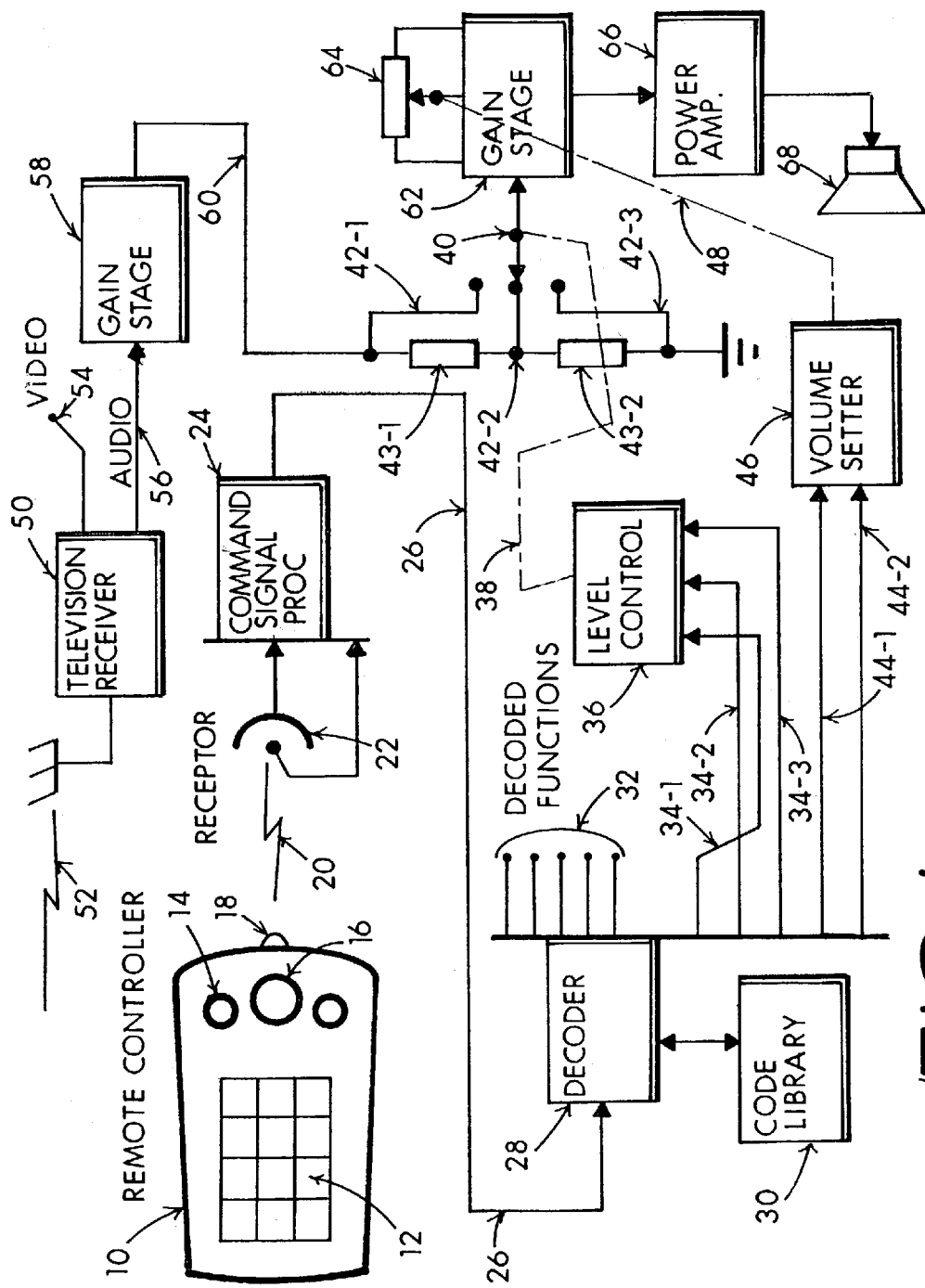
FIG. 1—Schema for an overall arrangement for my invention, used in conjunction with a television receiver and intended to provide three steps of remote volume level selection including "normal", "hush" and "mute".

A remote control 10 includes a keypad including a plurality of keybuttons 12 into which a user may enter selections to serve as instructions for a remotely controlled entertainment apparatus. Most commonly, these selections are for televisor "channel numbers". The keypad entries are translated between a sender 18 (such as an infrared light emitting diode) by a wireless signal 20 that is locally picked-up by a photoreceptor 22 coupled with a command signal processor 24. The command signal processor is essentially a selective amplifier function which directs a detected control signal 26 to a decoder 28. The signal sent from the remote controller 10 to the receptor 22 is characteristically encoded so as to be uniquely recognized as a command function. A code library 30 of key patterns is coupled with the decoder, thereby enabling the immediate recognition of specific commands entered via the keypad as particular output commands such as on lines 32, which may direct channel selection when they are coupled with the television receiver 50 (connection not specifically shown but practice is well known in the art). As a result, the television receiver 50 may accept a plurality of incoming 52 television signals and select one of those signals represented by a particular channel number to deliver a video signal 54 to a display and an audio signal 56 to a gain stage 58.

Other decoder 28 outputs 34-1,34-2,34-3 are directed to a level control function 36 coupled 38 with a "selector" 40, shown in schema form as a switch depicted to select between three different sound levels appearing on lines 42-1,42-2, 42-3. The top line 42-1 usually couples directly with the audio gain state 58 output line 60, whereas the line 42-2 is derived from the juncture of resistors 43-1,43-2. Similarly, the line 42-3 is grounded, with no substantial signal presence. In effect the switch 40 selects between line 42-1 for "normal", line 42-2 for "hush" and line 42-3 for "mute". The experienced practitioner shall recognize that this is a functional depiction and that other well known techniques may be utilized to determine the several levels on lines 42-1,42-2 and 42-3.

Looking back to the remote controller 10, it shall be found that a preferably independent-acting MUTE keybutton 14 and a HUSH keybutton 16 may be included. These keybuttons, when actuated by a user, send an encoded signal 20 which is suitably decoded so as to command the level control 36 to select the corresponding mode via line 38 coupled with the selector 40. Hence, pressing the HUSH keybutton 16 may direct the selector 40 to find the line 42-2 signal, serving to reduce the "normal" volume level to a lesser level. Similarly, the actuation of the MUTE keybutton 14 may determine the selector 40 to couple with the line 42-3 and essentially quiet the sound level.

When the selector 40 is "normally" coupled with the full volume line 42-1, the sound fed to the gain stage 62 may be further controlled by a "volume control" 64. The (variable) gain stage 62 output couples with an audio power amplifier 66 and subsequently to an audio reproducer (e.g., loudspeaker, headphone, etc.) 68.

It shall be found that the decoder 28 outputs 44-1,44-2 respond to the usual "volume UP" and "volume DOWN" keypad entries normally associated with ordinary remote controllers. These decoded volume command signals couple with a volume controller 46 which in effect "sets" the volume control 64.

Figure 2:
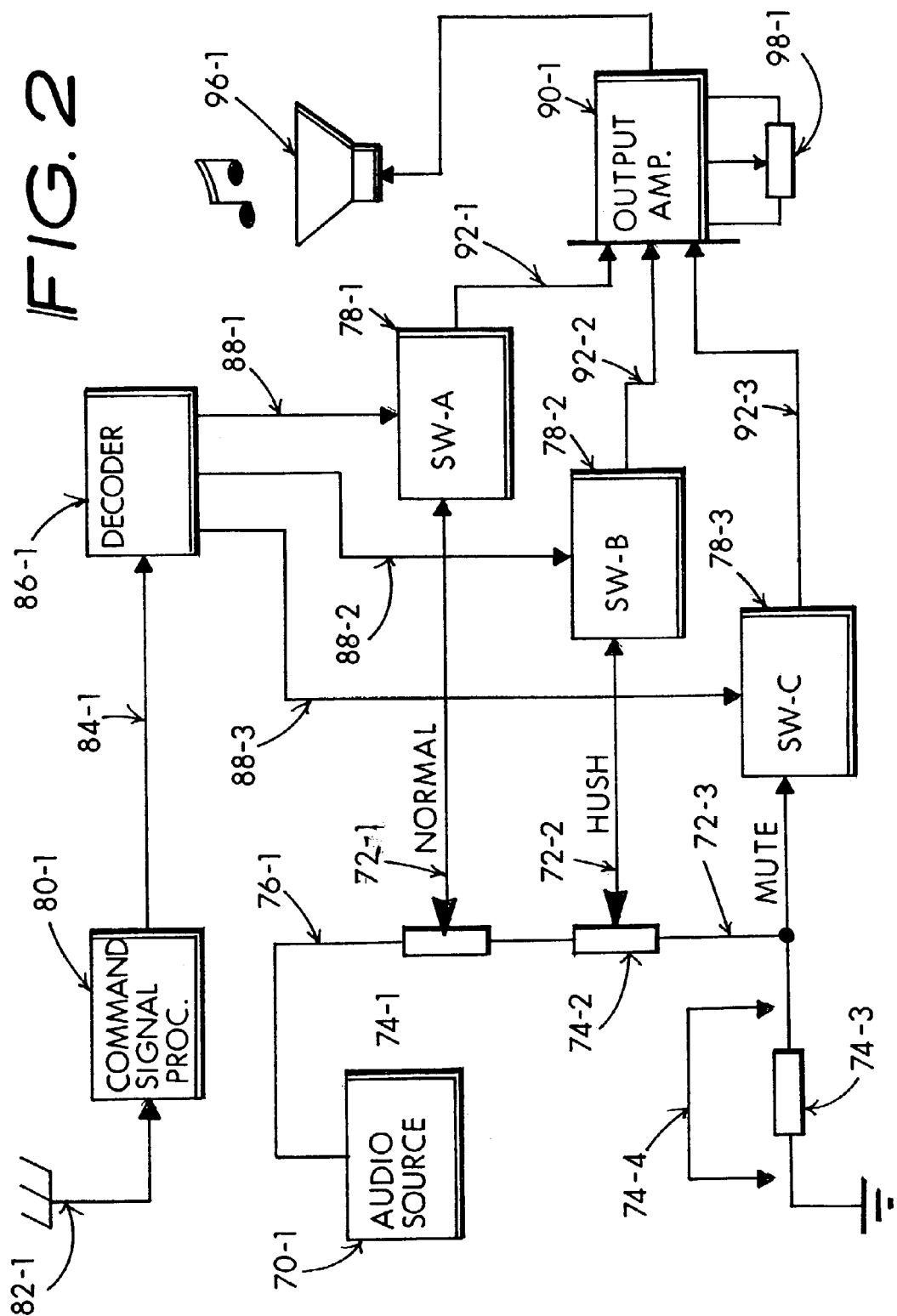
FIG. 2—Schema detail for setting a non-interactive "normal" and "hush" level.

A variation of the invention's teaching appears now in FIG. 2 to include a command signal processor 80-1 set to receive 82-1 wireless command signals typically delivered by a portable commander such as the controller 10 of FIG. 1. The processed command signals on line 84-1 couple with a decoder 86-1 similar to the decoder 28 of FIG. 1. An audio source 70-1 (such as the sound signal delivered from a television receiver) couples with a serial string of resistors, including potentiometers 74-1,74-2 and fixed resistor 74-3 (which may be alternatively replaced by a low resistance shunt 74-4). A characteristic of this depiction is that the instant volume level of the signal on line 76-1 is "set" by a volume control, usually operable by the user. Thus, understand that the instant audio level on line 76-1 may be considered changeable. The result is that "normal" volume is set by the potentiometer 74-1 to be delivered on line 72-1 to a switch 78-1. Similarly, the "hush" volume level is determined by the potentiometer 74-2 to be delivered on line 72-2 to a switch 78-2. Likewise, the mute signal may be derived on line 72-3 and is typically near nil, particularly if the (negligible resistance) shunt 74-4 is utilized in lieu of the resistor 74-3.

The decoder 86-1 provides three mutually exclusive selection signals on lines 88-1,88-2,88-3 correspondent with analog switches 78-1,78-2,78-3. As a result, a selection determined by which one of the selection signals and analog switches is presently active appears as an audio signal on line 92-1,92-2 or 92-3 coupled with the input of an output amplifier 90-1 that may deliver 94-1 a drive signal to a loudspeaker 96-1 or similar reproducer. In this configuration the "normal" audio level set by potentiometer 74-1 and the "hush" level set by potentiometer 74-2 may be independently adjusted, with the caveat that the lowest "normal" level may never be set less than the highest "hush" level. While not shown, a separate "volume control" associated with the audio source 70-1 or else the output amplifier 90-1 may be advantageously used to maintain a substantially constant relationship between the normal and hush levels, although the overall volume level delivered by the reproducer 96-1 may be changed.

Figure 3:
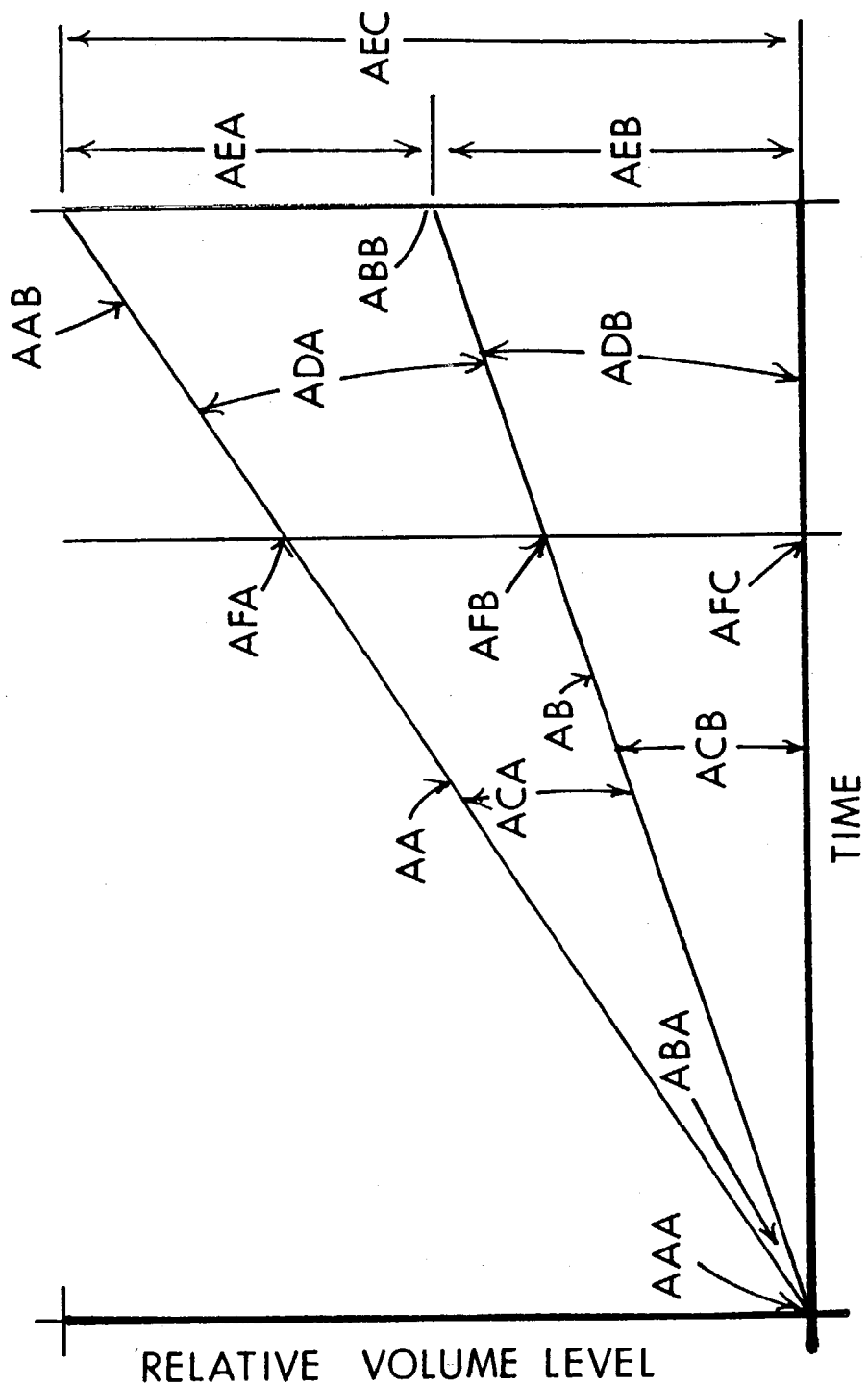
FIG. 3—Graphical representation of the non-interactive settings delivered by the arrangement of FIG. 2.

The operative action of the circuit of FIG. 2 is depicted in a graphical representation of FIG. 3. Line AA shows the immediate audio level delivered by the source 70-1 on line 76-1 to be adjustable (usually by a user operable volume control associated with the audio source 70-1) over a wide range, between nil level AAA and maximum level AAB. This adjustment is typically accomplished with a "volume control" manipulated by the user. Aa a result the normal volume level delivered by the reproducer 96-1 may vary in accord with the user's preferences.

I further show that a "hush" level AB may be set at some level between the immediate level AA and the nil (or baseline) level AAA. In ordinary practice, the sound level of a source such as a television receiver may be varied only over the range depicted by the immediate audio level line AA, or else muted to the nil or baseline level AAA.

The essence of one preferred embodiment this invention is depicted by the midway line AB which varies with change in the audio level setting of line AA. Further realize that the level depicted by line AB is generally set by the potentiometer 74-2 and may be changed over a range where the difference in level depicted by range ADA is determined by the ratiometric relationship between the setting of potentiometers 74-1 and 74-2. In other words, if the adjustment of the potentiometer 74-1 is set to the "bottom" and the adjustment of the potentiometer 74-2 is set to the "top", the levels delivered on lines 72-1 and 72-2 will be approximately the same. However, as the potentiometer 74-1 arm is moved "upwards" while the potentiometer 74-2 arm remains in the "top" setting, the tilt of line AA will increase while the tilt of line AB remains constant. The result is that the settable difference between line AA and line AB as defined by the range ADA widens.

What this boils down to is that the range AEB over which the hush level may be varied is limited by the present ratiometric setting of the potentiometers. The percentage of available line AA volume level reflects the sum of AEA+AEB and may not exceed 100% of the volume level established on line AA.

Illustratively, look at a situation where the potentiometers have about the same resistance value and the potentiometer 74-1 is set with its arm nearest the top end associated with the signal line 76-1. Under this condition, when the potentiometer 74-2 is set near its top end (coupled with the bottom end of potentiometer 74-1), the volume of the signal on signal line 72-2 will best be defined as level AFB about midway between immediate volume level AFA and nil level AFC. As the arm of the potentiometer 72-2 is moved "downwards", the tilt of line AB will decrease towards the baseline level AAA (or nil level AFC). Hence, the immediate hush level is in an overall sense adjustable over the range extending AEC between the immediate level of line AA and the baseline level AAA with the absolute range determined by the adjustable relationship established between the settings of the potentiometer arms 72-1,72-2.

Figure 4:
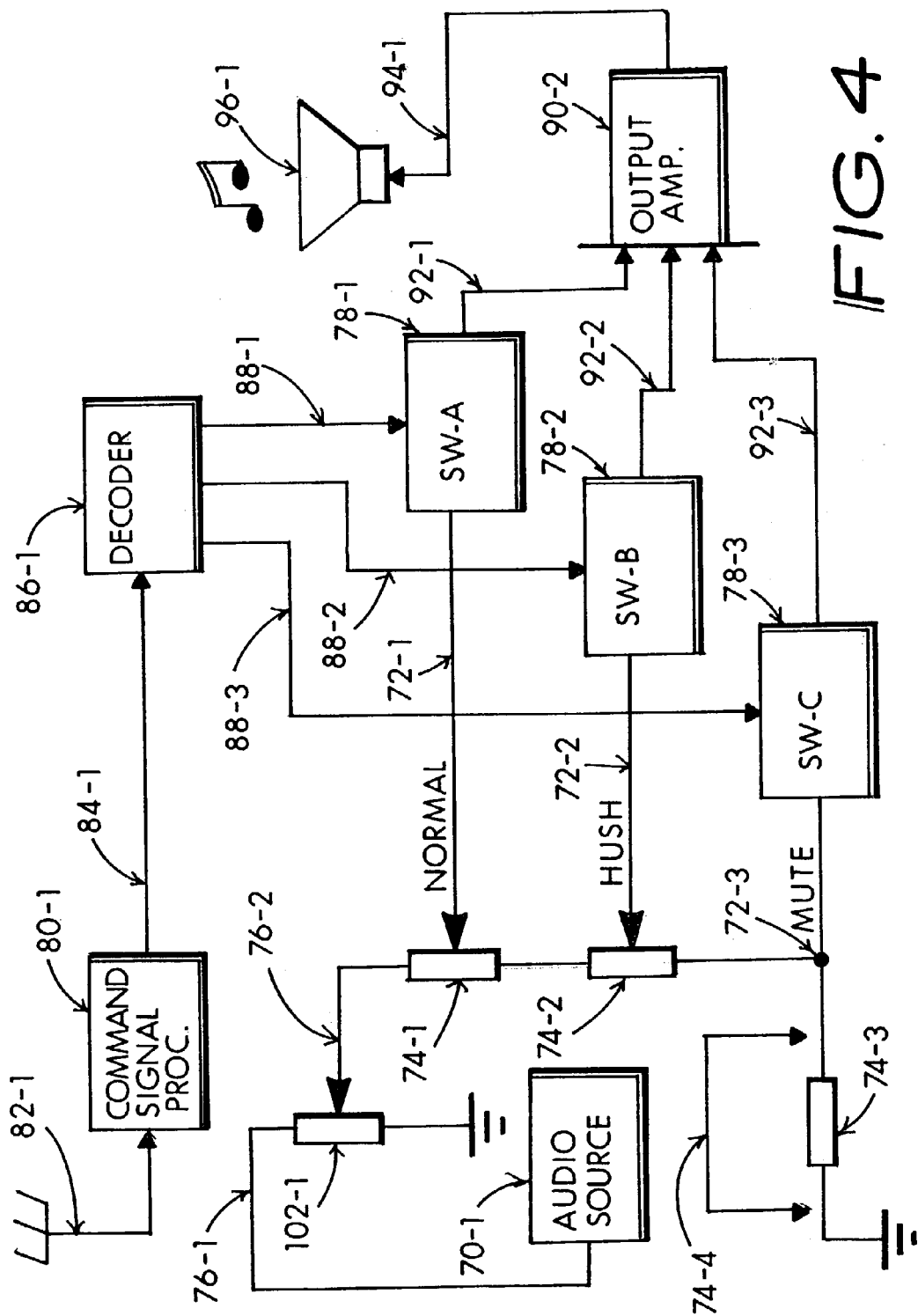
FIG. 4—Schema detail for maintaining the "hush" level proportional to setting changes in the "normal" volume level.
Figure 5:
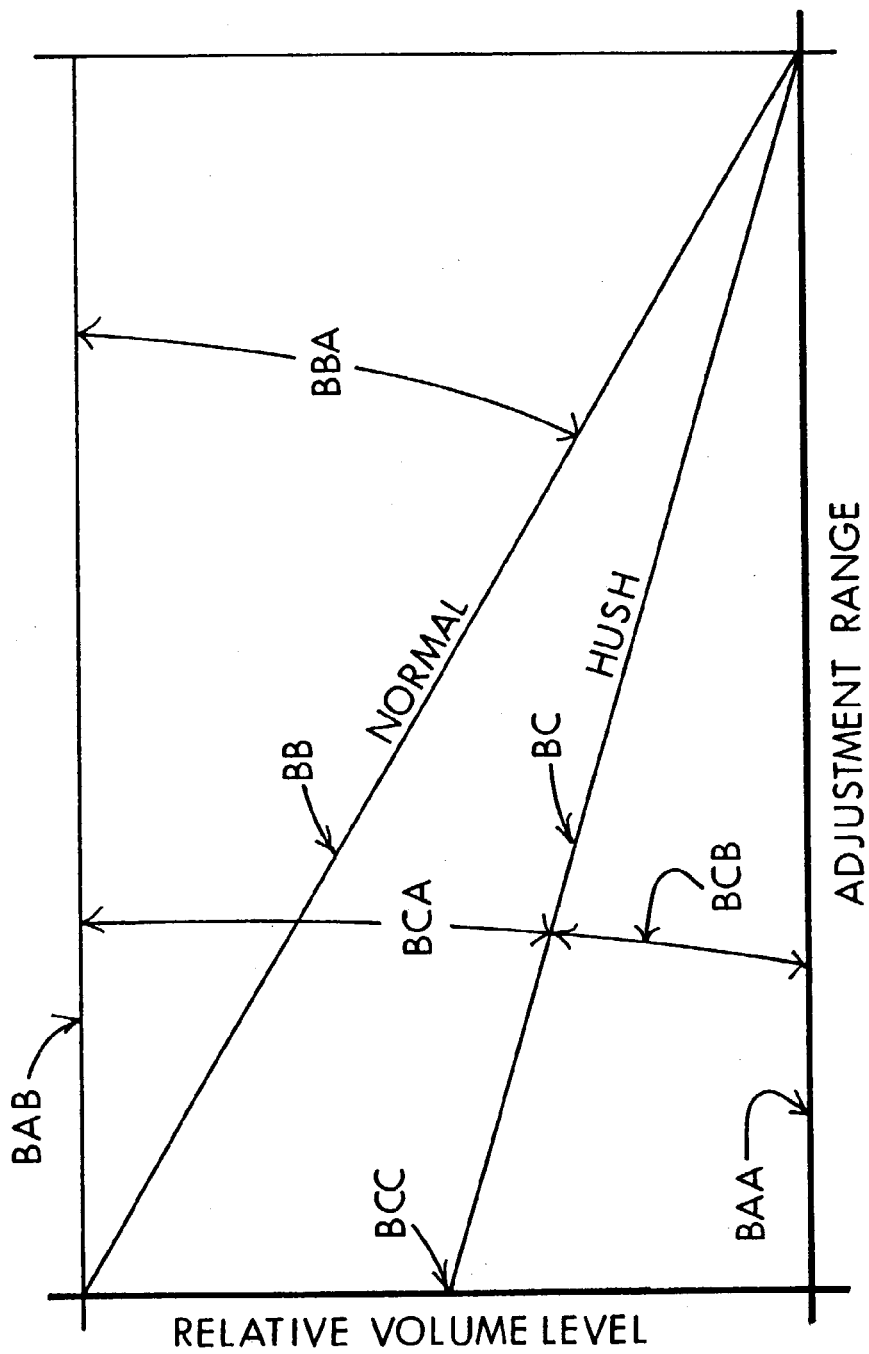
FIG. 5—Graphical representation of the proportional settings for "normal" and "hush" volume levels delivered by the arrangement of FIG. 4.

Looking now towards FIG. 4, the hookup is similar to that of FIG. 2 with the addition of a level setting arrangement associated with the source signal line 76-1 which couples with a potentiometer 102-1, the arm of which is adjustable delivering a setable level signal on line 76-2 coupled with the potentiometer 74-1 as mentioned relative with FIG. 2 and depicted as line BA in FIG. 5.

More particularly, FIG. 5 shows the input level provided on signal line 76-2 to be presently constant as determined by the potentiometer 102-1 setting and depicted as line BAB of FIG. 5. When the potentiometer 74-1 arm 72-1 is extremely set near its bottom, the hush level setting control 74-1 may vary over a range BB extensive BBA between the maximum signal line 76-1 level and the nil level BAA.

When the two potentiometers 74-1,74-2 are of equivalent value and the arm of potentiometer is extremely set to its top end the maximum "hush" level BCC is about 50% of the normal level BAB and may be varied over a reduced range BCB between the intermediate level BCC and the nil level BAA.

When the two potentiometers 74-1,74-2 differ in value, the level BCC relative with level BAB may be readily determined where:

$$BBB = 1-(R1/(R1 + R2)) \times BAB$$

Where:
  BAB = Normal Audio Level (FIG. 5)
  BBB = Maximum Hush Level
  R1 = value of potentiometer 76-1
  R2 = value of potentiometer 76-2

Figure 6:
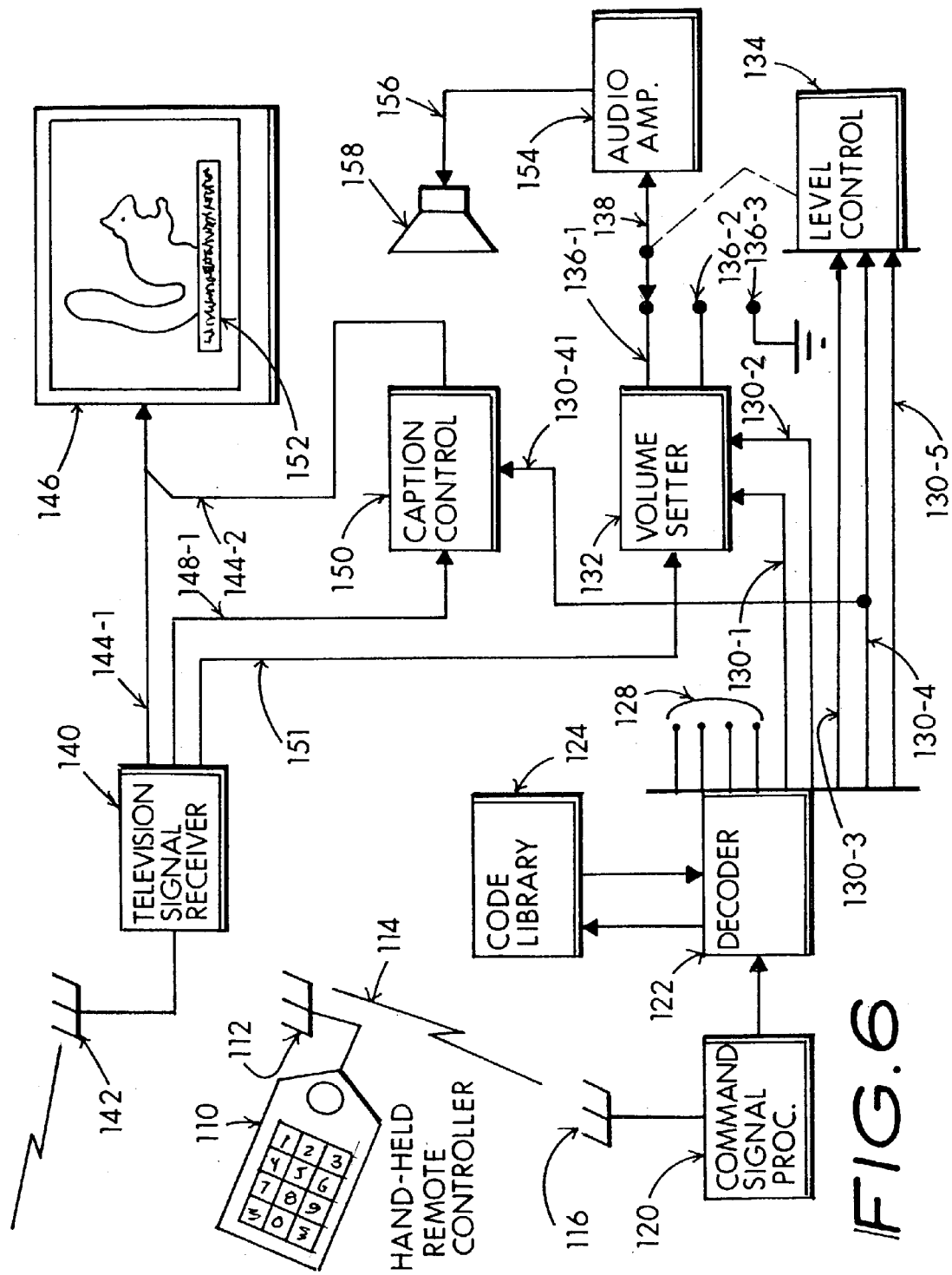
FIG. 6—Graphical depiction for maintaining "hush" level in a non-linear proportional relationship with the "normal" volume level to compensate for sound translation efficiencies.

An overview of a remotely controlled televisor appears in FIG. 6 to include a remote controller (commander) 110 which includes a wireless emitter 112 for sending an encoded command signal 114 to a receptor 116 coupled with a command signal receiver 120. The command signal processor receives and digitizes the incoming signal for application to a decoder 122 which in conjunction with a code library 124 recognizes the users command and selects the appropriate output line, including lines 128 which are directed to functions associated with the televisor 146 (such as channel selections, etc.).

When the user changes the (usual) volume-UP or volume-DOWN settings using the remote controller 110, signals are delivered on line 130-1,132 to adjust volume in association with the volume control function 132. In practice of this invention, this function 132 may be a variable gain amplifier stage or digitally controlled attenuator. The output delivered on line 136-1 is "normal volume" level, while line 136-2 may deliver a reduced "hush volume" level. Signals delivered on lines 130-3,130-4,130-5 control "normal", "hush" and "mute" modes using the level controller 134 which for illustrative schema purpose operates a switch 138 to select between the normal line 136-1, hush line 136-2 and mute line 136-3.

Television programming is received 142 by a television signal receiver 140. Attendant program signals are detected and fed to several other functions, including line 144-1 which provides the video display on the television screen 146. Audio content is coupled on line 152-1 with the volume control function 132, which operates as previously described to establish a "hush" mode, amongst other modes.

Modern television receivers include closed caption signals which may be delivered on line 148-1 to a caption controller 150. The result is a caption signal on line 144-2 which serves to display the captions 152 on the televisor screen. In usual operation, the viewer may elect whether the captions are enabled or not. Frequently, televisors include provision for enabling captions during mute. In this invention, the captions are automatically enabled during the "hush" mode as determined by a hush command signal on line 130-4 being branched 130-41 to the caption controller 150. An advantage of this automatic enablement of captions is that although the sound is greatly reduced by the hush mode, viewers can still "read-along" with the program dialogue.

The selected-level 138 audio signal couples to the input of an audio amplifier 154 which couples 156 the amplified audio signal to a loudspeaker 158 or other reproducer.

Figure 7:
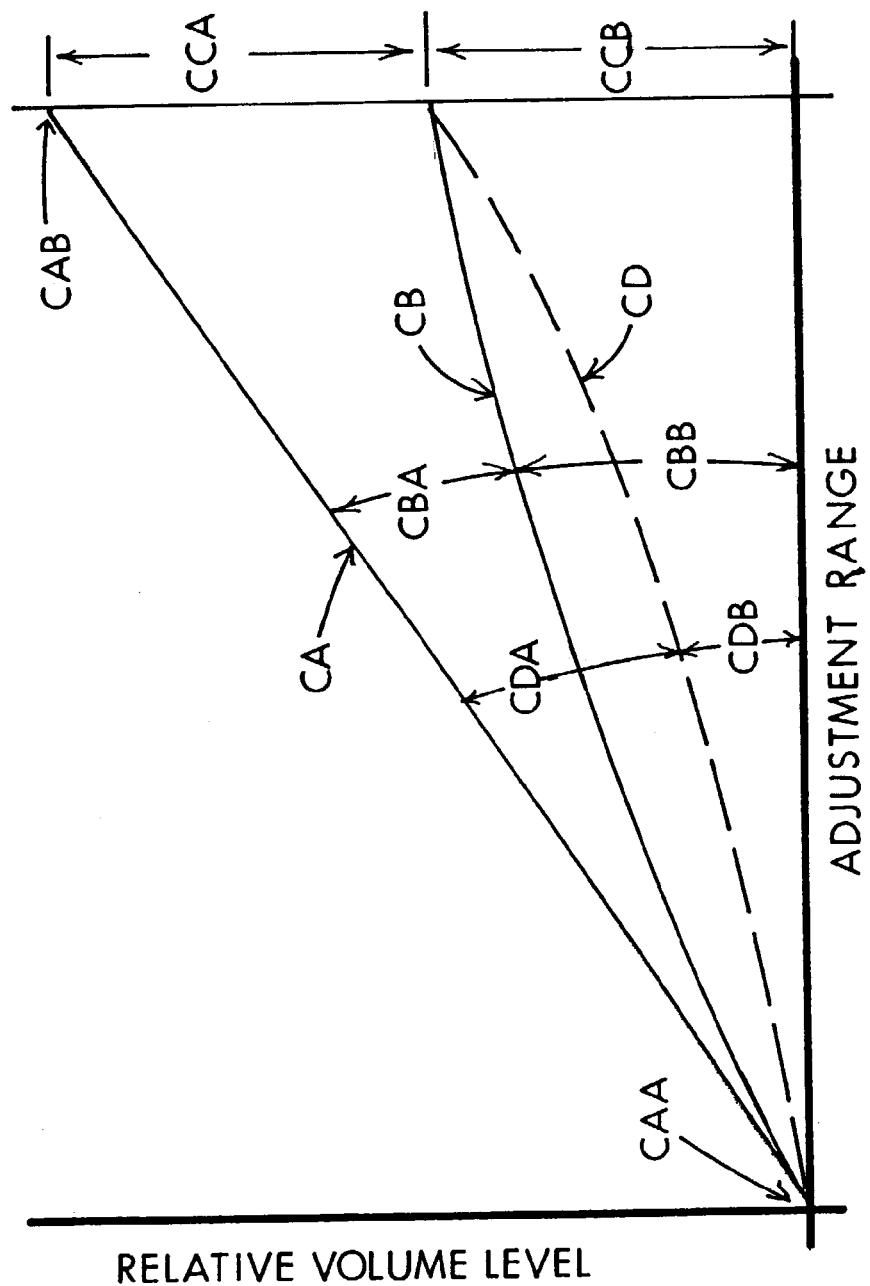
FIG. 7—Schema for an overall arrangement for a televisor including "captions" which may be automatically activated when the sound is "hushed" (or "muted").

A non-linear difference CBA,CBB between the hush signal CB and the normal signal CA is depicted in FIG. 7. What this shows is the non-linear reduction of the hushed sound CB relative with reductions in the normal volume setting occurs more gently compensating for reductions in hearing sensibilities of some users. Conversely, the non-linear difference CBB may be utilized in preference, where the difference CDA,CDB between a lowering of the normal sound CA and the hush level may occur at an increased rate. Again, this non-linear relationship may suit some user's operating conditions better than a purely linear relationship as depicted earlier in FIG. 3.

To qualify the plot depicted in FIG. 7, the normal volume level CA may ordinarily be adjusted by the user over a range from minimum CAA to maximum CAB levels, typically using the known volume-UP and volume-DOWN keybuttons included on most remote controllers. The hush level is depicted CCA,CCB as about 50% of maximum normal volume. The non-linear relationship between the instant normal volume level and the hush level may be derived from circuitry associated with the volume setter function 132. In other words, the output line 136-2 may decrease more or less rapidly relative to the output line 136-1 with overall changes in sound volume.

Figure 8:
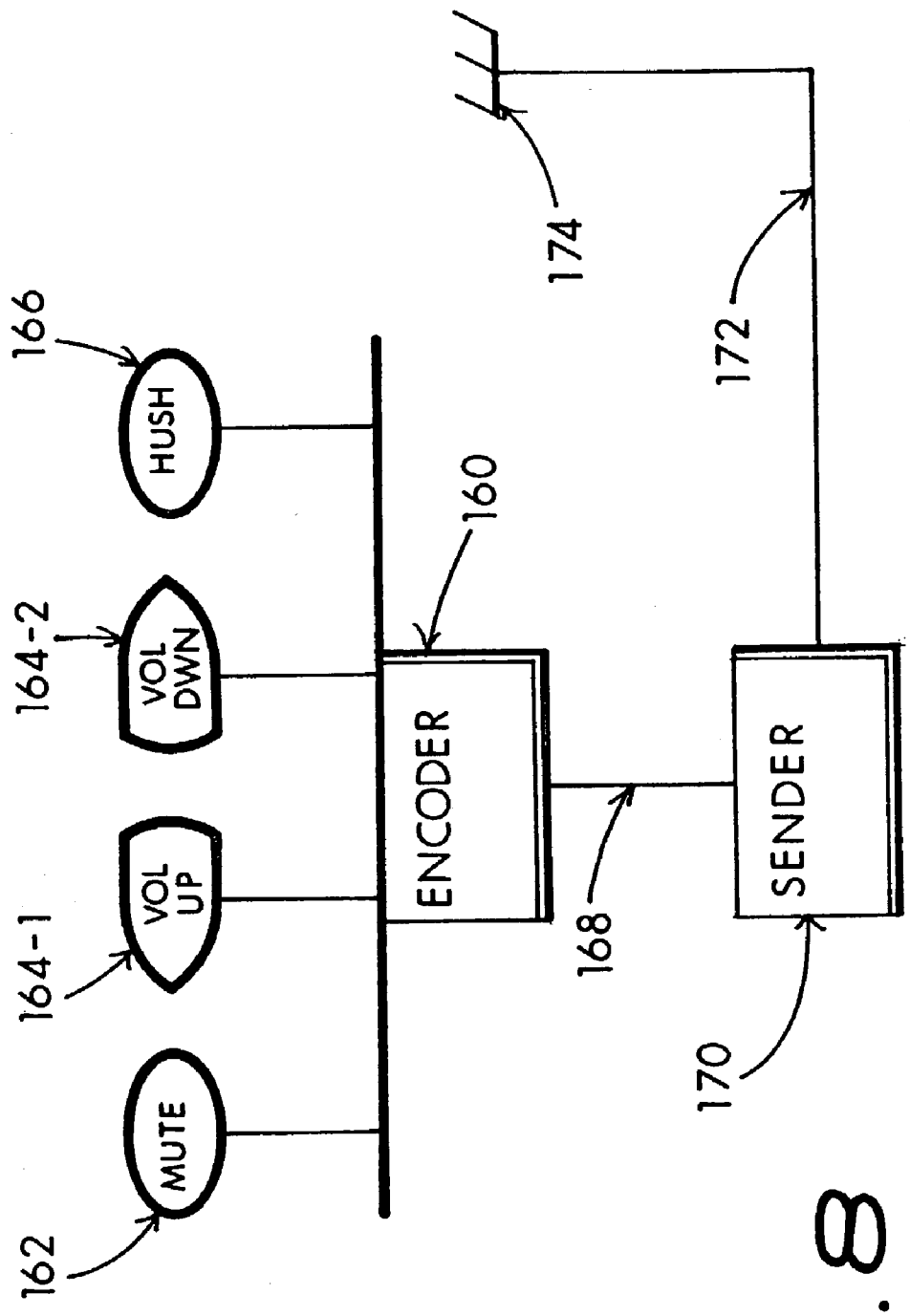
FIG. 8—Functional diagram depicting several keybutton inputs which may be enacted on a handheld remote controller to include benefit of the "hush" function.

A typical remote controller function diagram is shown by FIG. 8, with the primary purpose being to illustrate novel inclusion of the HUSH control 166. In addition, the usual MUTE keybutton 162, VOL-DWN keybutton 164-1 and VOL-UP keybutton 164-2 are shown. The several keybutton functions are gathered by an encoder 160 to deliver an encoded signal on line 168 which modulates a sender 170, delivering a wireless signal 172 to an emitter 174. This figure mostly depicts the novelty of including the HUSH keybutton 166, heretofore believed unknown in the art.

At this point it is noteworthy to say that the use of HUSH as a term for volume reduction is mere jargonization of a term which may just as well be expressed by other terminology including, but not limited to "soften", "quiet", "reduce", "lower" and so forth. The underlying point is merely that the "hushed" volume level is generally established to be less than the normal listening volume level.

Figure 9:
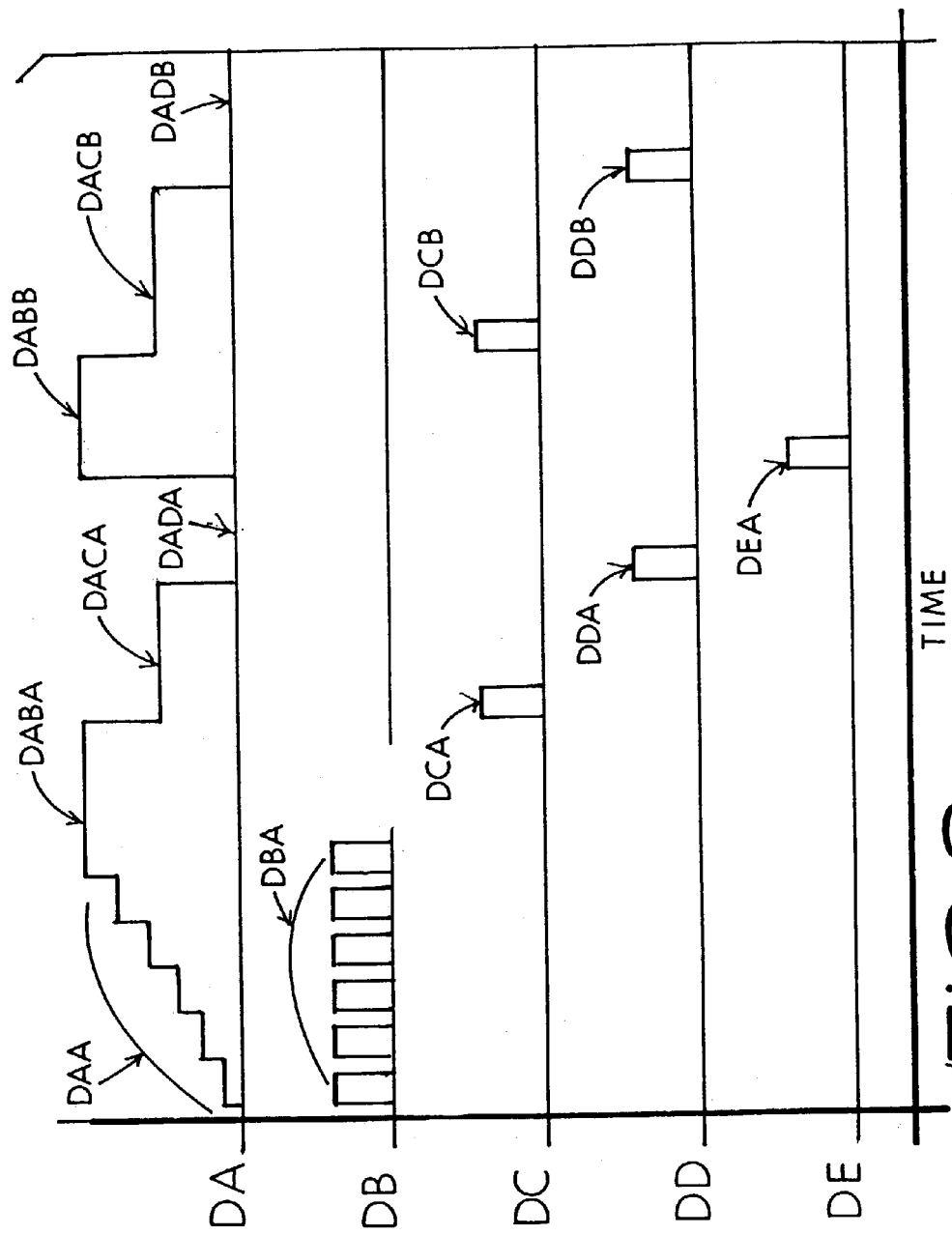
FIG. 9—Graphical representation of the various volume setting provisions offered by the invention, including the "hush" mode.

Operation of one embodiment of the invention is expressed in FIG. 9, where line DA includes a series of steps DAA conveying an increase in normal volume obtained, in usual practice, by a series of pulses DBA shown submitted on line DB as the result of an actuation of the volume-UP keybutton function provided on the usual remote controller. This results in a setting of the normal volume to a level DABA. Unique to this invention, a HUSH keybutton may be actuated to deliver a "hush" command pulse DCA on line DC. Concurrent with this pulse is an immediate reduction of the normal sound level DABA to a reduced level DACA.

Most remote controllers do include a MUTE keybutton function that, when actuated, delivers a pulse DDA on line DD that fully quiets the audio level DADA. An un-mute pulse (which may merely be a repeat of the mute pulse) DEA on line DE returns the sound volume back to the normal level DABB. Further shown is that a repeat of the HUSH pulse DCB brought on by keybutton actuation will once again reduce the normal audio level DABB to a quieter hush level DACB. Furthermore another mute signal DDB will re-mute the sound volume level DADB.

Figure 10:
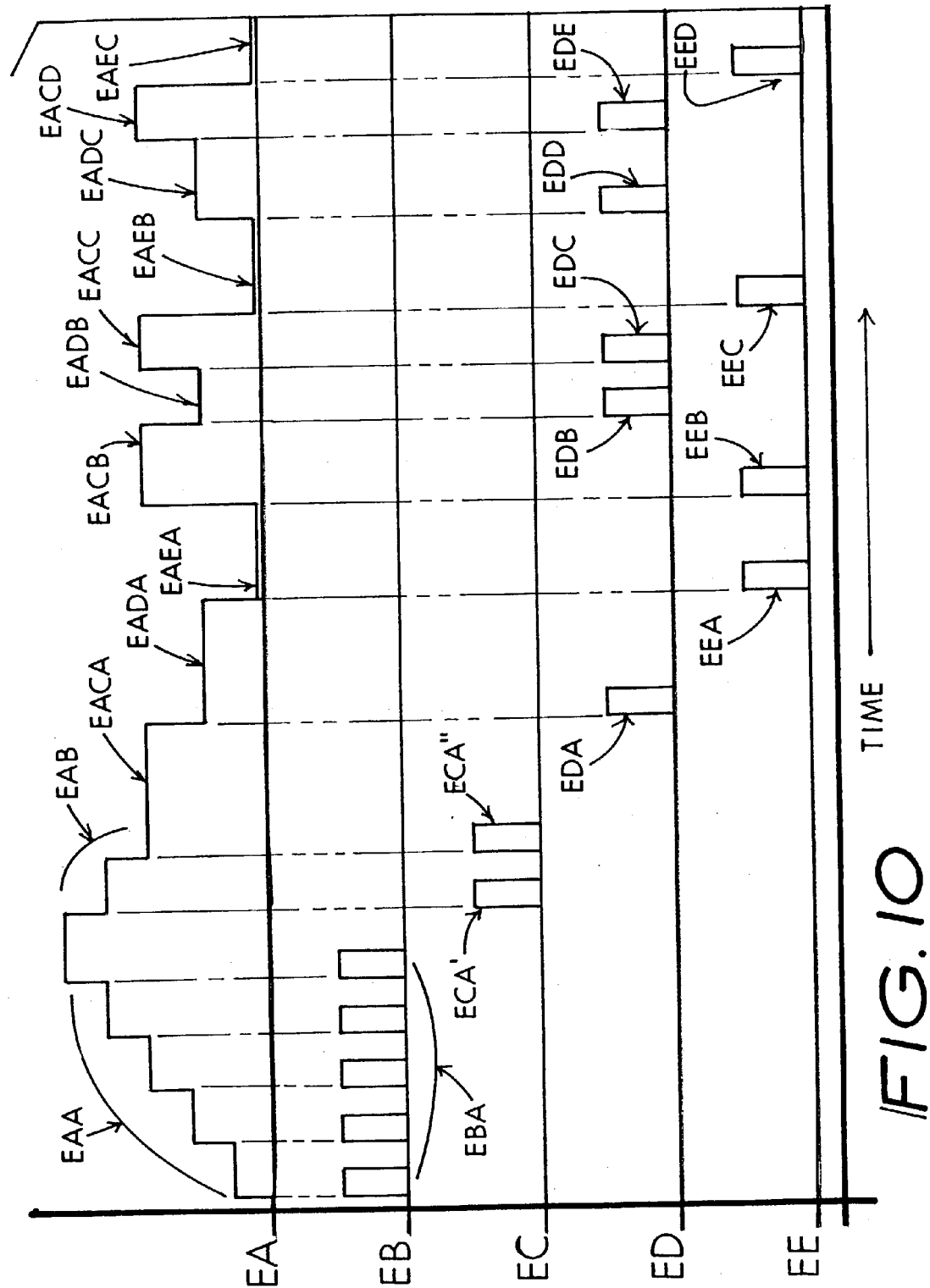
FIG. 10—Graphical representation showing up-stepping and down-stepping the volume, together with a "hush" provision maintained in constant proportion with the last-setting of the volume.

With FIG. 10 the various actions of volume-UP, volume-DOWN, HUSH and MUTE are woven together into a representative program of events. Volume-UP signals EAA on line EA increase the sound volume to a normal level using the volume-UP keybutton to send volume increase pulses EBA on line EB to the remotely controlled device. Sound volume may also be somewhat lowered (as if it were to loud as first set) by using the volume-DOWN keybutton to send volume lowering pulses ECA on line EC. These pulses step the volume down EAB to a preferred listening level EACA. Line ED includes numerous HUSH command signal pulses. The first hush pulse EDA lowers the sound volume to a quieted level EADA set between normal volume level FACA and zilch. Further to come along is a mute pulse EFA on line EA which simply silences the sound level EAEA as is well known prior art practice. The next mute pulse EEB returns the sound level to the normal listening level FACB. The next hush pulse EDB again reduces the sound level to the softer level EADB, maintained until the next hush pulse EDC occurs, as ordinarily wrought by a re-actuation of the HUSH keybutton, whereupon the sound level returns to normal volume EACC.

Further along a mute pulse EEC again lowers the sound to zilch EAEB. Now viewing the next hush pulse EDD to occur during the muted state EAEB returns the sound level to the quieted "hush" level EADC. A subsequent hush pulse EDE further returns the sound level to normal volume EACD. Subsequently another mute pulse EED may again fully quiet the sound EAEC and so forth, ad infinitum in an near-endless variety of interactive combinations.

Figure 11:
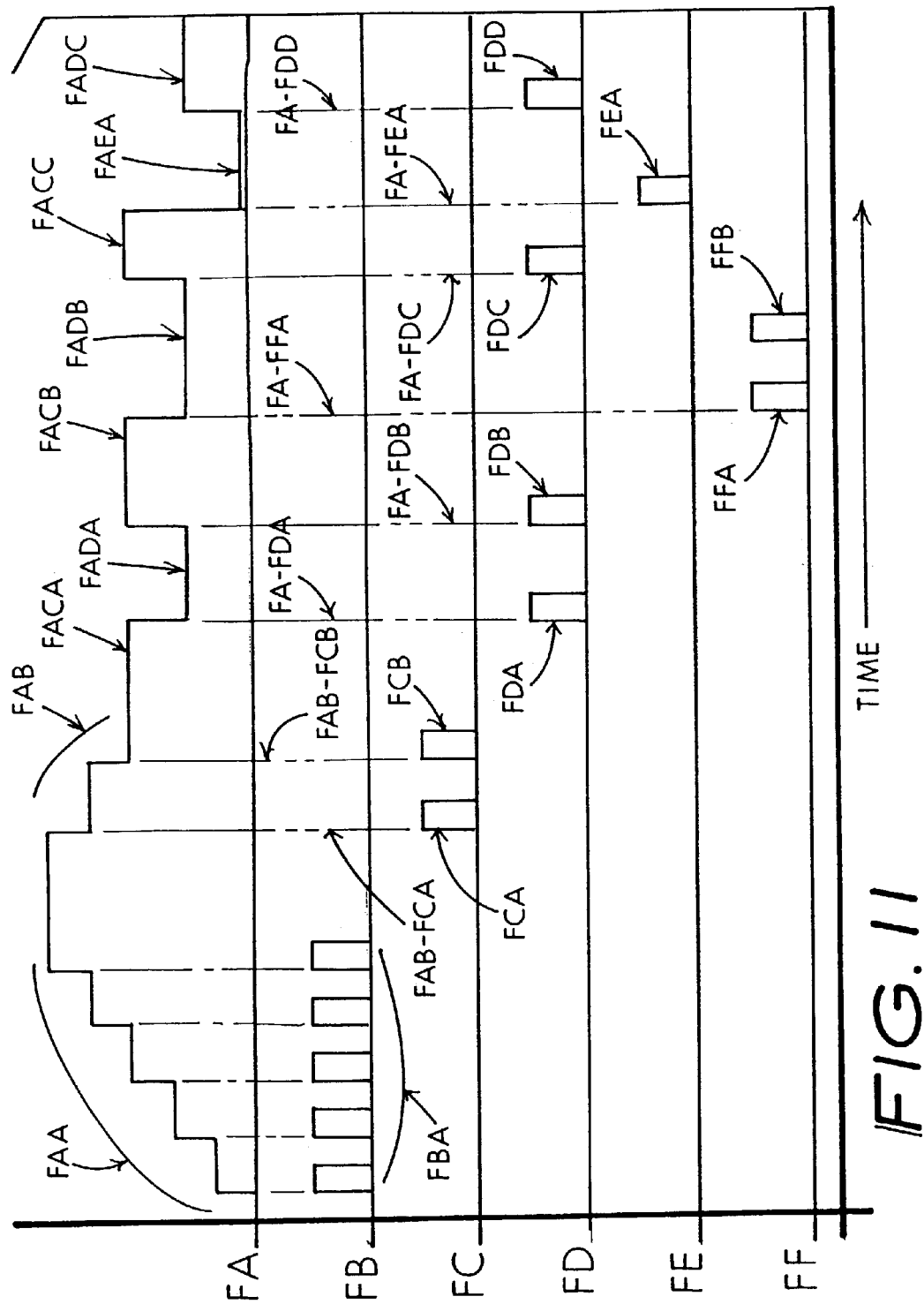
FIG. 11—Graphical representation showing an automatic enactment of the "hush" mode when a tuning (e.g., channel-change) is effected.

Continuing with FIG. 11 the sound volume shown on line FA is increased FAA by a series of volume-UP pulses FBA and slightly reduced FAB by coincidence FABFCA, FABFCB volume-DOWN pulses FCA,FCB to a preferred volume level FACA. Occurrence of a hush pulse FDA delivered from the remote controller commands the preferred volume level FACA to drop to the quieter level FADA where it is maintained until the next hush pulse FDB occurs and the volume level returns to the preferred level FACB.

As a further convenience to the user of this invention, channel change digits may serve to lower the volume subsequent to a station or program change. Line FF depicts a second digit FFA, first digit FFB sequence typical of a channel change command. These signals serve to reset the tuning of a television set, or satisfy an equivalent program change function. Observe that the occurrence of the second digit pulse FFA brings about an immediate reduction of the sound level FACB to a quieter hush level FADB. Subsequently the sound may be returned to the normal, preferred level FACC by another actuation of the HUSH keybutton, delivering the hush-pulse FDC.

Also shown is the intention occurrence of a mute pulse FEA on line FE that lowers the sound level to about nil FAEA. A further actuation of the HUSH keybutton introduces another hush pulse FDD which serves to recover the audio volume to the quieted level FADC. As was said relative with FIG. 11, these representative interactions between a variety of hush, mute, channel change and volume adjust commands may continue ad infinitum in an almost endless variety of sequential combinations.

I claim for my invention:

1. An audio level reduction method to immediately moderate an immediate level of prevailing sound volume delivered from an entertainment apparatus, comprising steps of:
   establishing the entertainment apparatus to deliver a first preferred volume level of sound reproduction;
   defining a mute level where the sound reproduction is substantially silenced;
   presetting the entertainment apparatus to fixate a first HUSH level as a second preferred volume level intermediate between the first preferred volume level and mute; and,
   first remotely controlling the entertainment apparatus to presently establish one of a plurality of selectable levels of sound reproduction including at least the first preferred volume level, the mute level and the first HUSH level.

2. The audio level reduction method of claim 1 wherein a defining of the first lowered volume level is selected to further include one of a group of steps including:
   i. establishing the first HUSH level as an absolute level independent from various user established settings of the first preferred volume level; and otherwise,
   ii. establishing the first HUSH level to automatically change over an intermediate range maintained proportional to the difference between the various user established present settings of the first preferred volume level, and the mute level.

3. The audio level reduction method of claim 1 comprising further steps of:
   embodying the entertainment apparatus to include a televisor; and,
   enabling "closed caption" sub-titling to appear on the televisor's viewing screen concurrent with a user's selection of at least the first HUSH level.

4. The audio level reduction method of claim 1 comprising further steps of:
   configuring a remote controller to enable a manual urging of a keybutton entry of a first preset value defining a first selection as the first HUSH level;
   first asserting momentarily unique modulation of a first command signal weighted by the first preset value;
   first sending the first command signal as a first encoded wireless command signal;
   remotely receiving and decoding the encoded wireless command signal and deriving the first defined selection of the first HUSH level; and,
   asserting an immediate lowering of the level of sound reproduction to the first HUSH level.

5. The audio level reduction method of claim 4 comprising further steps of:
   said presetting the entertainment apparatus to further fixate a second HUSH level as a third preferred volume level intermediate between the first preferred volume level and mute;
   said manual urging the keybutton entry of a second preset value defining the second HUSH level;
   said asserting the momentarily unique modulation of the command signal weighted by the second preset value;
   said sending the command signal as the second encoded wireless command signal;
   extending the remote reception and decoding of the second wireless command signal to educe the second preset value defining the second HUSH level; and,
   said immediately lowering the level of sound reproduction to the second HUSH level.

6. The audio level reduction method of claim 1 comprising further steps of:
   submitting keybutton entries in a unique predetermined pattern;
   recognizing the predetermined pattern as a HUSH level setup mode;
   utilizing volume adjust keybuttons to increase and decrease the HUSH level to a desired volume level;
   storing the desired volume level as a setting for the HUSH level in subsequent usage of the HUSH mode; and,
   exiting the HUSH level setup mode.

7. The audio level reduction method of claim 1 comprising further steps of:
   sensing a change in tuning of the entertainment apparatus between a first signal setting and a second signal setting; and,
   automatically establishing the first HUSH level in an immediate response to the sensing of the change in the tuning.

8. Sound volume level quieting method generally for entertainment apparatus and particularly a televisor, comprising steps of:
   first remotely controlling the entertainment apparatus to presently deliver at least one of a first volume mode and a muted volume mode of sound reproduction; and,
   second remotely controlling the entertainment apparatus to deliver at least a first hushed volume mode having a presettable HUSH level established intermediate between the first volume mode and the muted volume mode.

9. The first hushed volume mode of claim 8 to include a further step selected between one of:
   i. first defining the presettable HUSH level as an absolute volume level; and otherwise,
   ii. second defining the presettable HUSH level as a relative volume level maintained proportionately intermediate between an immediate setting of the first volume mode and the muted volume mode.

10. The sound volume level quieting method of claim 8 further comprising a step of:
    enabling a closed-captioning display to appear on the televisor's viewing screen concurrent with a user's selection of at least the first hushed volume mode.

11. The sound volume level quieting method of claim 8 further comprising steps of:
    configuring a portable remote controller to include a manual entry port that may be actuated by a user to initiate sending a wireless first HUSH command to the entertainment apparatus; and,
    receiving the wireless first HUSH command to effectuate the second remote control of the entertainment apparatus and determine at least the first hushed volume mode.

12. The sound volume level quieting method of claim 8 further comprising steps of:
    submitting a unique sequence of keybutton entries in a predetermined pattern;
    recognizing the predetermined pattern to effectuate a HUSH level setup mode;
    adjusting the immediate HUSH volume level;
    storing the adjusted immediate HUSH volume level setting parameters;
    exiting the HUSH level setup mode;
    recalling the stored said HUSH volume level setting parameters in response to a subsequential call-up of the HUSH mode by user submitted HUSH keybutton activity.

13. The sound volume level quieting method of claim 8 further comprising steps of:
- configuring a portable remote controller to include a keypad offering an array of numerical keybuttons which may be decisively actuated and initiate sending wireless commands to urge tuning or channel selection changes in the remotely controlled entertainment apparatus; and,
- sensing the urged tuning or channel selection changes and usually evoking a reductive change in the first volume mode to the first hushed volume mode.

14. A portable remote controller apparatus for commanding a remotely controllable entertainment apparatus comprising:
- a keypad means populated with a plurality of keybutton means utile for accepting immediate manual entries by a user;
- a sender means responsively adapting the manual entries into encoded command signals sent to the remotely controlled entertainment apparatus;
- the keybutton means usually configured to admit the immediate manual entry of program selection digits whereby a change program selection command signal may be effected;
- the keybutton means usually further configured to admit the immediate manual entry of audio volume increases and decreases in incremental steps;
- the keybutton means usually further configured to admit the immediate manual entry of a "mute" command effective for substantially silencing the audio volume; and further including:
  - the keybutton means further configured to admit the immediate manual entry of a first HUSH command effective for abruptly moderating the audio volume of the remotely controlled entertainment apparatus to a first reduced audible level;
  - whereby, the user may select the first reduced audible level usually preset between normal volume and mute.

15. The portable remote controller means of claim 14 further comprising:
- the keybutton means further configured to admit the immediate manual entry of a second HUSH command effective for abruptly moderating the audio volume of the remotely controlled entertainment apparatus to a second reduced audible level;
- whereby, the user may select between more than one extent of reduced audible level.

16. The portable remote controller apparatus of claim 14 wherein the keybutton means presently configured to admit the immediate manual entry of the program selection digits may concurrently effectuate and submit a HUSH command to the translator means for conveying a HUSH command to automatically lower the audio level of the entertainment apparatus whenever the immediate program selection is changed;
- whereby, when the user changes a program selection the audio level is automatically reduced to a more moderate setting.

17. The remotely controllable entertainment apparatus of claim 14 comprising a television receiver apparatus including a video display, comprising:
- a caption processor means effectuate to deliver an on-screen display of textual captions representing audio content at least concurrent with the first HUSH command having established a period of first reduced audible level;
- whereby, when the audio volume is reduced by the first HUSH command a viewer may continue to follow the audio content as a display of the textual captions.

18. The audio level control of claim 14 further comprising:
- the remote controller means to include:
- a command receiver means configured to control the entertainment apparatus;
- the command receiver responding to a wireless signal which serves to convey the encoded command signals originated by the remote controller;
- a program selection changer means responsive to immediate changes in the manual entry of program selection digits associated with the remote controller apparatus and conveyed to the command receiver means by the encoded command signals;
- a HUSH level control means responsive to an immediate change in the program content established by the program selection changer means and effectuate to moderate the audio volume of the entertainment apparatus;
- whereby the change in program selection initiates an automatic reduction of the audio volume level delivered by the entertainment apparatus.

19. The remotely controllable entertainment apparatus of claim 14 comprising a television receiver apparatus configured for reception of at least two program channels and including:
- a channel change detector for reporting a change in program channel selection; and,
- an automatic quieting means for establishing the abrupt moderation of the audio volume in immediate response to the reported change;
- whereby in a television receiver a change between each of a plurality of the program channel selections implements an automatic abrupt "hush mode" moderation of the audio volume attendant with the immediate program selection.

20. The portable remote controller apparatus of claim 14 wherein the translator means is further configured to include a setup means enabling a user to remotely change a preset value for the first reduced audible level.

* * * * *